Sept. 6, 1966 R. C. BLACKMORE 3,271,096
PROJECTOR CONSTRUCTION
Filed Aug. 5, 1963 4 Sheets-Sheet 1
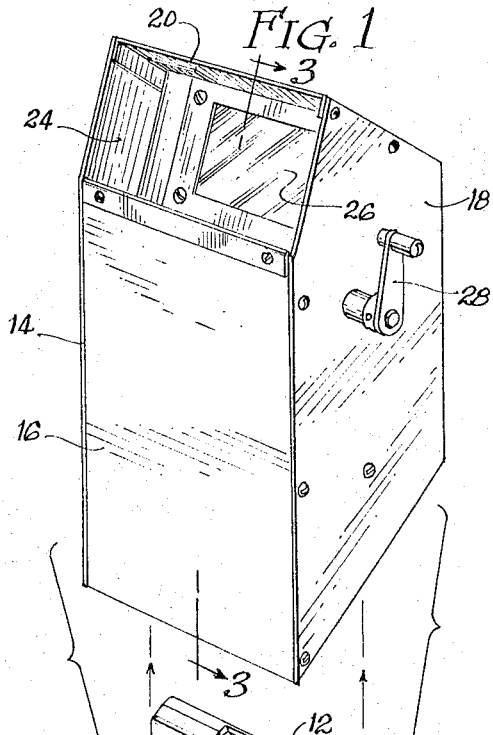
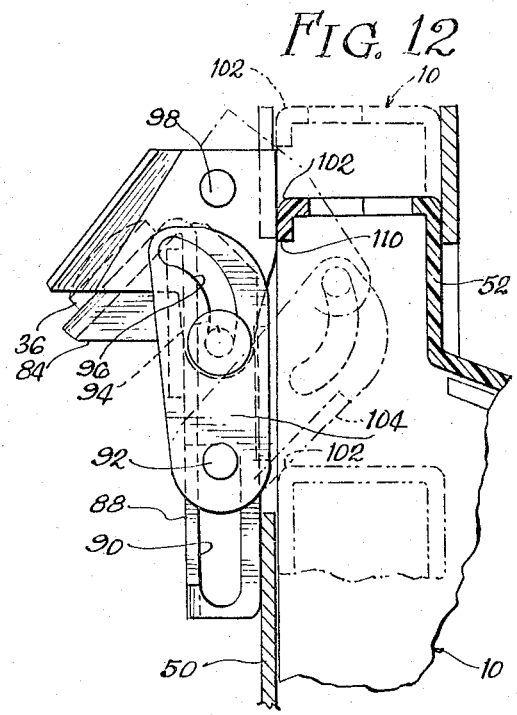
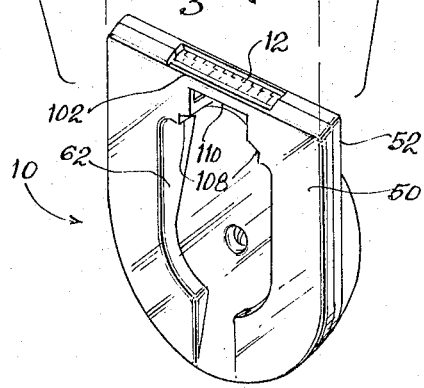
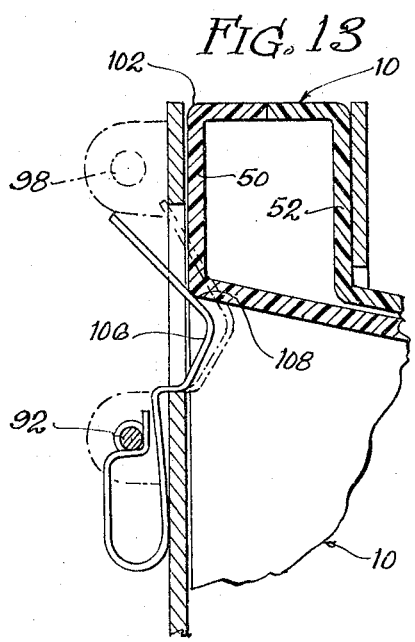
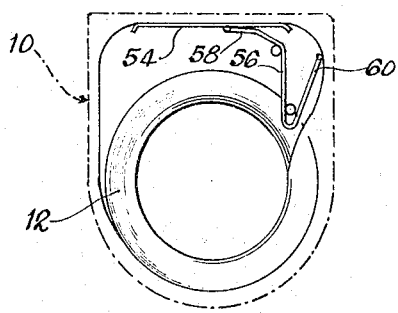
INVENTOR.
Robert C. Blackmore
BY Ooms, McDougall and Hersh
Attys

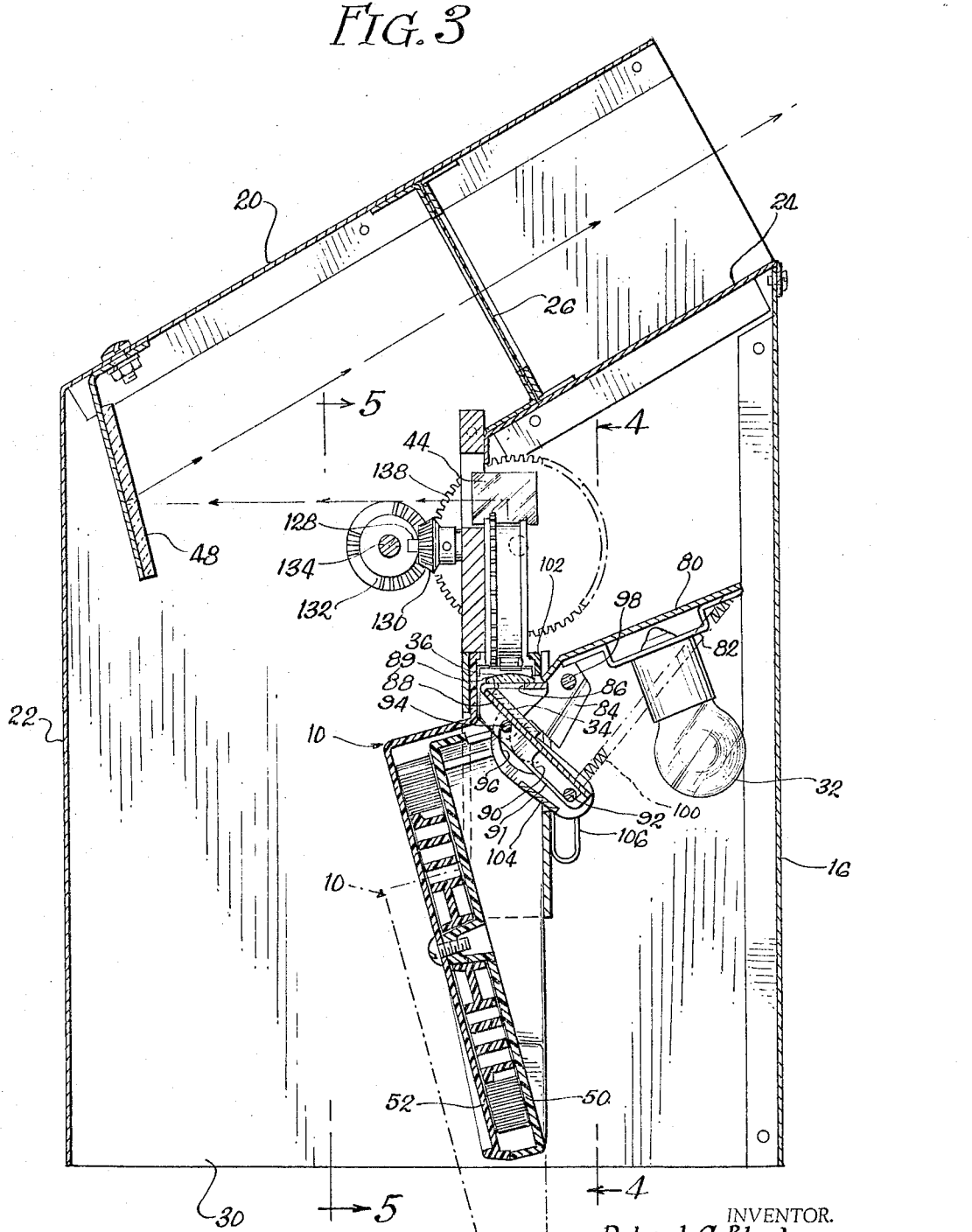

INVENTOR.
Robert C. Blackmore
BY
Ooms, McDougall and Hersh
Att'ys

Sept. 6, 1966  R. C. BLACKMORE  3,271,096
PROJECTOR CONSTRUCTION
Filed Aug. 5, 1963  4 Sheets-Sheet 4
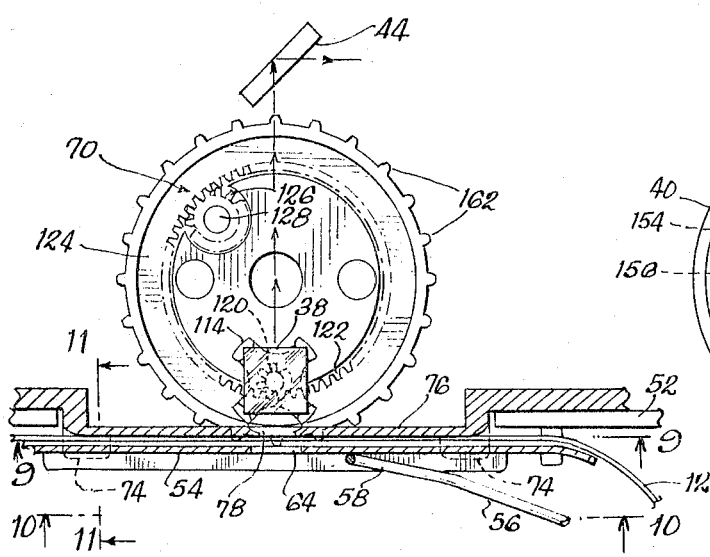
INVENTOR.
Robert C. Blackmore
BY
Dome, McDougall and Hersh
Att'ys

United States Patent Office 3,271,096
Patented Sept. 6, 1966

1

3,271,096
PROJECTOR CONSTRUCTION
Robert C. Blackmore, 3950 Lake Shore Drive,
Chicago, Ill.
Filed Aug. 5, 1963, Ser. No. 299,952
9 Claims. (Cl. 352—72)

This invention relates to a projector construction which is particularly designed for individual viewing.

Projector constructions have previously been devised whereby they are particularly suitable for viewing by a single individual or a relatively small group. Such constructions usually include a small projector screen which is formed as part of the construction whereby one or more persons must be situated directly in front of the screen in order to view the filmed subject matter. These constructions are particularly desirable where a limited amount of space is available or where the individual seeking to view a film strip does not wish to take the trouble to set up a large screen. In many cases, projectors of this type are also desirable where the viewer does not wish to disturb other individuals in a room. A plurality of such projectors can be provided for educational purposes whereby a group of students can view any number of different subjects without interfering with the conduct of other students.

It is an object of the instant invention to provide an improved projector construction which is particularly designed for use by an individual or a small group of persons.

It is a more particular object of this invention to provide a projector construction of the type described which is characterized by a very simple mode of operation whereby virtually any person can be easily instructed with respect to the use of the construction.

It is an additional specific object of this invention to provide a projector construction which is particularly designed to accommodate film strips of the type included in cartridges whereby the film can be loaded into the construction in an extremely simple manner, and whereby the individual operating the device can view the subject matter any number of times without the necessity for handling of the film.

It is a further specific object of this invention to provide a projector construction of the type referred to which is to be manually operated whereby the individual viewing the material can control the speed of the strip or stop the strip at any time for more detailed study.

These and other objects of this invention will appear hereinafter, and for purposes of illustration, but not of limitation, specific embodiments of this invention are shown in the accompanying drawings in which:

FIGURE 1 is a perspective view of the projector construction and the film cartridge to be employed therewith;

FIGURE 2 is an elevational view illustrating in detail the film arrangement within the film cartridge;

FIGURE 3 is an enlarged vertical elevational view taken about the line 3—3 of FIGURE 1;

FIGURE 6 is a detail fragmentary view of the drive mechanisms employed in the projector construction;

FIGURE 7 is a detail fragmentary view illustrating a lens and lens holder employed in the construction;

FIGURE 8 is a detail vertical elevational view taken about the line 8—8 of FIGURE 4;

FIGURE 9 is a detail elevational sectional view taken about the line 9—9 of FIGURE 6;

2

Figure 5:
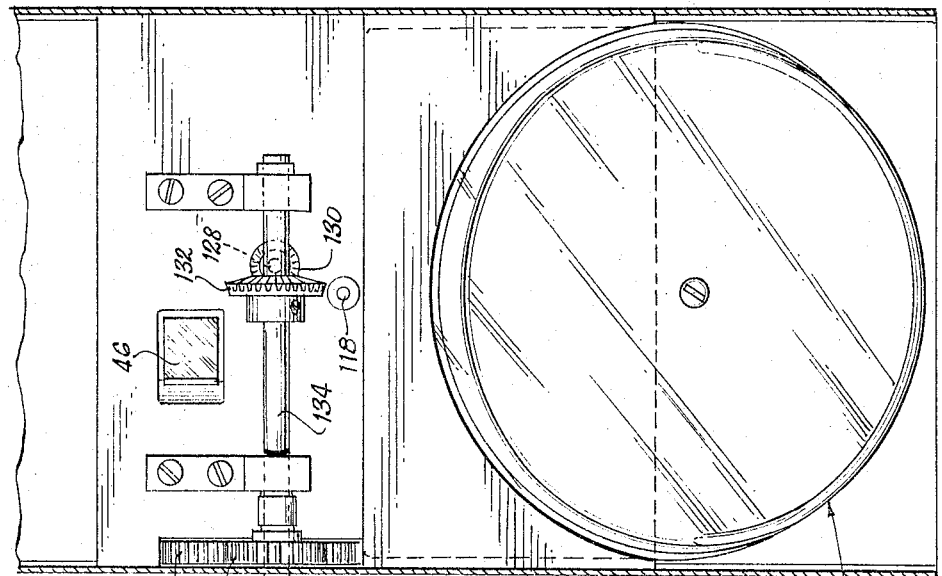
FIGURE 5 is a vertical elevational view taken about the line 5—5 of FIGURE 3.
Figure 4:
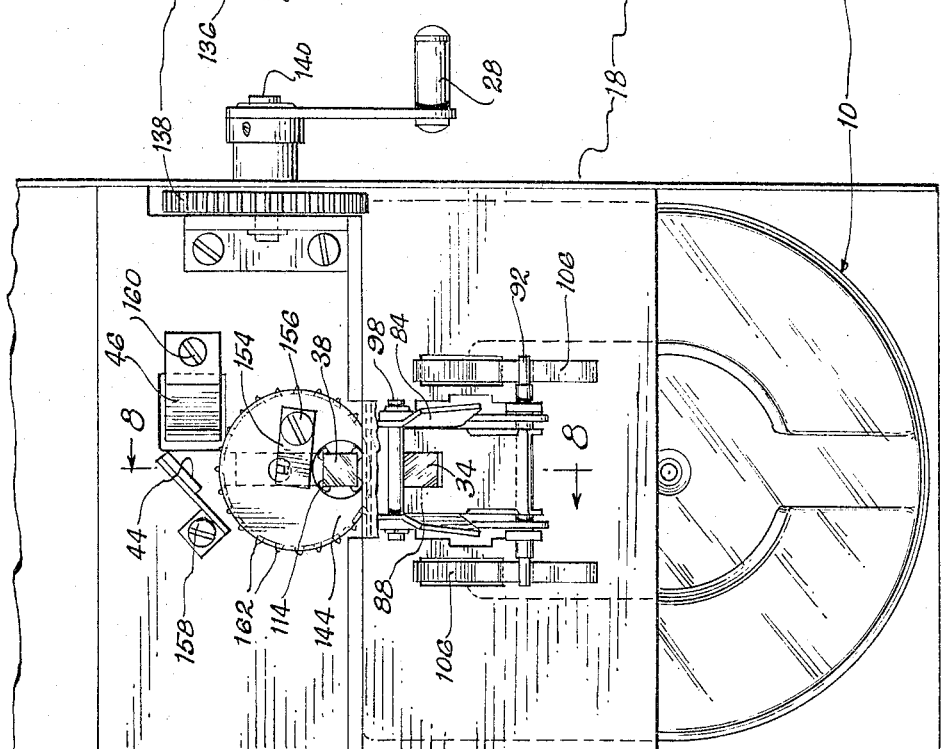
FIGURE 4 is a vertical elevational view taken about the line 4—4 of FIGURE 3.

FIGURE 10 is a detail elevational sectional view taken about the line 10—10 of FIGURE 6;

FIGURE 11 is a detail vertical sectional view taken about the line 11—11 of FIGURE 6;

FIGURE 12 is an enlarged fragmentary view of a lens, mirror, and light source mounting structure; and, FIGURE 13 is a fragmentary view of additional means associated with the mounting structure of FIGURE 12.

*General operating features*

As previously indicated, the construction of this invention is particularly suitable for use in combination with film cartridges of the type shown at 10 in FIGURE 1. These cartridges have an endless length of film 12 disposed therein and the film is adapted to be moved by operating mechanisms in the construction of this invention whereby a motion picture effect is realized.

The actual projector construction comprises a housing 14 having a front wall 16, side walls 18, top wall 20 and back wall 22. The front wall 16 defines an opening 24 which is recessed and which includes a projector screen 26 within its interior. A manual operating handle 28 is associated with the side wall 18 whereby the operator of the device can view the material on the film strip by looking at the screen 26 while rotating the handle 28.

In the embodiment illustrated, the cartridge 10 is inserted through the opened bottom 30 of the construction. A light source 32 (see FIGURE 3) is provided for directing light through each of the frames of the film strip 12 whereby projection onto the screen 26 can be achieved. Transmission of the light is effected first by means of mirror 34 which directs the light through lens 36 and then through the film strip. As best shown in FIGURES 6, 7 and 8, the light is then projected through a prism 38, through lens 40 and 42 and then onto closely associated reflecting mirrors 44 and 46. These mirrors in turn direct the light onto mirror 48 which passes the light to the projector screen 26.

As will appear hereinafter, the operation of the construction simply requires insertion of the film cartridge whereby the film strip will be ultimately included in the desired light beam path. Rotation of the handle 28 will provide for movement of the film strip past the projection aperture to effect the desired projection. There is no loading or handling of the film required and the operator can manually control the speed of the film to effect slow motion or complete stopping of the film where a detailed study is necessary. Furthermore, movement of the film can be speeded up where portions of the film are of no interest.

*Film cartridge*

The film cartridge 10 consists of two sections 50 and 52 which form the housing for the film strip 12. As best shown in FIGURE 2, portions of the film strip pass from the inner portion of the roll of film over a guide plate 54 and then are rewound about the outer portion of the roll. By driving the film in this manner, the endless length of film can be continuously moved over the guide plate for repeated showing of the subject matter without the necessity for any reverse movement of the film or for threading operations.

The guide plate 54 within the cartridge is held in position by means of a spring 56. The end 58 of this spring normally urges the guide plate toward the top of the cartridge while the other end 60 of the spring serves to hold the film strip in a path directed toward the passage over the guide plate.

The section 50 of the cartridge includes a large recessed portion 62 which is provided so that light can be passed through the aperture 64 in the guide plate and then through the film strip. As shown in FIGURE 3, passage of the light is effected by means of mirror 34 and lens 36 which are adapted to be positioned within this recessed portion of the film cartridge.

The structure of the guide plate 54 is best shown in FIGURES 9, 10 and 11. This guide plate in addition to the aperture 64 includes an elongated opening 66 which is positioned whereby the sprocket holes 68 in the film strip 12 will pass over this opening. As will appear hereinafter, the sprocket wheel 70 of the drive mechanism is adapted to engage the holes 68 by reason of the provision of this opening 66.

Additional openings 72 are also provided in the plate 54. These openings are designed whereby accurate alignment of the plate 54 with respect to the light beam path can be achieved. In the embodiment shown, ears 74 are formed in an aperture plate 76 which is fixed within the construction. This aperture plate defines an opening 78 which must be aligned with the opening 64 to achieve proper projection of the light beam. When the ears 74 are received by the openings 72, this alignment can be achieved.

Light source mounting and cartridge loading

The specific structure for the elements which make up the light projection system include a pivotal mounting for the mirror 34, lens 36 and light source 32. The mounting consists of a stamping which includes a first portion 80 supporting a bracket 82 which in turn supports the light bulb. A bifurcated portion 84 of the stamping is pivotally mounted on the stationary rod 98. Extending outwardly from this bifurcated portion are ears 85 through which pin 94 extends. The pin 94 connects cam member 104 to these ears with the pin 94 being movable in arcuate slot 96 defined by the cam member.

The pin 94 also extends through the member 88 upon which the mirror 34 is mounted. A bent-over portion 89 of this member 88 provides a mounting for the lens 36. The member 88 includes side walls 91 which define slots 90 for receiving stationary rod 92.

The purpose of this mounting arrangement for the light source, mirror and lens is to provide clearance for the cartridge during insertion of the cartridge, and to also enable positioning of the mirror and lens after the cartridge has been inserted. When the cartridge is removed from the construction, the light source, mirror, and lens will assume the position shown in FIGURE 3. A spring 100, connected to the rod 92 at one end and to the stamping portion 80 at its other end, normally urges these members to this position.

The cartridge 10 is inserted through the bottom of the construction along a straight path as suggested by the dotted lines in FIGURE 3. The leading edge 102 of the cartridge will encounter cam surface 104 during this entry, and this engagement will result in pivoting of the member 88 about the pin 92. The provision of the slot 90 will also result in a slight downward movement of the member 88. The disposition of the lens and mirror supporting members when in this inoperative position is shown in full lines in FIGURE 12.

When the cartridge has been completely inserted, latching spring members 106 will engage the edge 108 of the cartridge as shown in FIGURE 13. The cartridge will thus be held in position while the construction is operated for viewing of the film strip.

During removal of the cartridge, the spring means 106 will yield in response to pressure applied by the edge 108 of the cartridge. In addition, the lens and mirror supporting members will be engaged by the cartridge to again clear these members from the path of withdrawal. Specifically, the edge 110 immediately below the edge 102 will contact the upper surface of the member 84. When this contact is achieved, the member 84 will pivot in a counterclockwise direction about the pin 98 (FIGURE 3). Similarly, the lens and mirror supporting member 88 will pivot through operation of the pin 94. When the cartridge has completely cleared, the spring 100 will restore the members to the position shown in FIGURE 3.

Image projection system

After the light passes through lens 36 and through the film strip, it encounters prism 38. The illustrated prism is a four-sided member rotatable about an axis perpendicular to the path of the light beam. Each corner of the prism is provided with a light blocking member 114. These members may be formed as part of a mounting bracket for the prism. Thus, as best shown in FIGURE 8, the mounting bracket 116 comprises arms which make up the members 114 and which also function to hold the prism for rotary movement about the axis 118.

Rotary movement of the prism is effected by means of gear 120 which is operatively associated with the internal ring gear 122 formed in the annular member 124. The member 124 is also operatively connected to pinion 126 which is mounted on shaft 128. This pinion, which also engages the internal ring gear, is driven by means of bevel gears 130 and 132. The gear 132 is secured to shaft 134 whereby it will be rotated in response to rotation of gear 136. This latter gear is operated through association with gear 138 mounted on the shaft 140 which carries the handle 28.

The prism 38 is mounted in a circular cavity formed in the lower end of the fitting 144. Communicating with this cavity is a bore 146 which receives a tubular member 148. A pair of lenses 150 and 152 are secured within this tubular member. The tubular member is connected to a lever arm 154 which is secured to the fitting by means of a screw 156. By loosening the screw 156, the arm 154 can be pivoted to adjust the position of the tubular member within the bore 146. It will be appreciated that optical considerations may necessitate such adjustments.

Communicating with the bore 146 is a first mirror 44 adapted to deflect the light beam at right angles from its path through the bore. A second mirror 46 again deflects the light beam at right angles whereby the beam will be passed to the mirror 48 for display on the propector screen 26. Screws 158 and 160 associated with the mounting means for the mirrors 44 and 46 permit minor adjustments of these mirrors.

Film drive means

Movement of the film is effected through engagement of sprocket teeth 162 formed on the outer periphery of the annular member 124. These sprocket teeth fit into the sprocket holes defined in the film strip and, as previously noted, the opening 66 in the plate 54 of the cartridge provide clearance for movement of the sprocket teeth. As best shown in FIGURES 6 and 9, a plate 76 is fixed within the construction, and an opening 166 defined in this plate corresponds with the opening 66 in the plate 54. Accordingly, the sprocket teeth actually extend beyond the lower surface of the plate 76 for engagement with the sprocket holes.

The film strip conventionally used in motion picture cameras provides for uniform location of the sprocket holes with respect to the frames in the film strip. Thus, the number of sprocket holes corresponds with the number of frames, and the sprocket teeth 162 are, therefore, arranged to interfit with each of the sprocket holes. This arrangement also enables proper projection of the images on the film strip for motion picture purposes since the control of the film strip movement can be synchronized with the movement of the prism 38. This synchronization of movement is possible since the prism 38 is driven by the same mechanism, that is the annular ring 124, as the film.

In the illustrated construction, the prism 38 is provided with four faces and the synchronized movement of this prism is such that one face will be exposed to light passing through the film strip at the same time as a frame is centered with respect to the apertures 64 and 78. On the other hand, the faces of the prism are angularly disposed with respect to the film strip and the light blocking means comes into play in the interval between centering of a given frame and positioning of the succeeding frame.

*General operation and use*

When an individual desires to study the material on a particular film strip, the cartridge containing this strip is first inserted through the bottom of the illustrated construction. In this connection, the side walls of the construction are preferably spaced apart a distance just sufficient to receive the cartridge. With this arrangement, the cartridge will be snugly received in the construction to thereby insure that the cartridge will remain in position during the viewing of the film strip. As an alternative arrangement, an appropriately dimensioned fitting can be included within the housing and attached to the side walls thereof.

After insertion of the cartridge, rotation of the handle 28 will provide for movement of the film strip past the apertures 64 and 78 whereby the material on the film strip can be viewed on the screen 26. The light source 32 can be operated by means of a battery or through a conventional electrical outlet. In the course of the viewing of the strip, the speed of rotation of the handle 28 by the viewer will determine the speed with which the frames pass the apertures and will, therefore, determine the naturalness of the movements of the characters in the film strip. Rotation of the handle can be slowed down to provide a slow motion effect or stoped to permit study of a particular frame. Furthermore, rapid rotation will enable passing of material which does not interest the viewer.

It will be noted that the gear system described herein is characterized by gear ratios which provide for movement of the strip at a speed in excess of the rotary movement of the handle 28. In accordance with the illustrated embodiment, the gears 136 and 138 have about a 1:3 ratio and a similar ratio exists between bevel gears 130 and 132. It will be understood, however, that the number of gears in the gear train and the gear ratio thereof can be varied to achieve a desired result. Furthermore, alternative drive mechanism are also obviously available to achieve the results of this invention.

It will be apparent that the use of the described construction is characterized by great simplicity since the construction is ready for operation immediately upon insertion of the film cartridge. There is no need for threading or rewinding of a film strip in order to initiate or to repeat a viewing sequence. Furthermore, the relative simplicity of the operating mechanisms described herein provides for an extremely economical construction.

The device of this invention can be employed for many applications including use in educational institutes. It will be apparent that large numbers of film strips contained in cartridges can be stored at a particular institute and made available for student use. By providing a number of the projectors described herein, individual students can study the material on a particular film strip without disturbing others and without requiring an unduly large working area. The use of the projectors for the viewing of film strips, recording athletic demonstrations, comprises an obviously valuable use since the movements and techniques of athletes can be easily studied by means of this device.

It will be understood that various changes and modifications can be made in the above described construction which provide the characteristics of this invention without departing from the spirit thereof particularly as defined in the following claims.

That which is claimed:

1. In a projector construction, the improvement comprising a housing, a film strip included in a cartridge mounted within said housing, said cartridge being of the type confining an endless length of film strip whereby repeated projection of the film strip can be accomplished without removal of the strip from the cartridge, a light source within the housing adapted to direct light onto frames in said film, a projector screen mounted on the housing for displaying the projected images on said strip, and drive means for engaging said strip to successively move said frames past said light source, said drive means including a manual actuating means whereby the strip can be stopped during projection and whereby the speed of movement of the strip past said light source can be manually controlled, said cartridge including a guide plate for said film strip with an aperture in said guide plate for passage of light therethrough, said strip including sprocket holes, an opening defined by said guide plate over which the sprocket holes of said film strip pass, a sprocket connected to said drive means having teeth adapted to extend through said opening and to be received by said sprocket holes for movement of said film, an aperture plate mounted in said construction having an aperture defined therein for communication with said first mentioned aperture, projections formed in said aperture plate, additional openings in said guide plate for receiving said projections to thereby accurately align said cartridge in said construction, a reflecting mirror and lens whereby said light source is adapted to direct light onto said mirror and then through said lens for passage through said film strip, means mounting said lens and mirror on a common pivotal axis, said cartridge including a recessed portion for receiving said mirror and lens in an operating position, and means on said cartridge for pivoting said mirror and lens between said operating position and an inoperative position to thereby provide clearance for insertion and removal of said cartridge.

2. A construction in accordance with claim 1 wherein said light source is also pivotally mounted for movement with said mirror and lens in response to the action of the pivoting means in said cartridge.

3. A construction in accordance with claim 1 wherein said light source is mounted on a member pivotally connected within said construction, means pivotally connecting said member with a second member supporting said lens and mirror, and a cam member engageable by the cartridge during insertion and removal, said cam member also being interconnected with said members whereby engagement of said cam member by said cartridge will provide for said clearance.

4. A construction in accordance with claim 1 including a bracket holding said prism, said bracket including arms engageable with the corners of said prism for holding said prism in the bracket, said arms also acting as said light blocking means.

5. A construction in accordance with claim 1 including an aperture plate fixed within said construction and defining an aperture for communication with the frames of said film strip, a rotatably mounted prism located adjacent said aperture and having a plurality of faces adapted to be exposed to light passing through said film strip, light blocking means adapted to close off said faces from exposure to said light during movement of said prism, and drive means for moving said prism whereby one of said faces is exposed as each frame of said film is positioned opposite said aperture.

6. A construction in accordance with claim 5 wherein said light blocking means comprises opaque means formed at the corners of said prism between adjacent faces thereof, and wherein said opaque means are dimensioned to substantially close off the aperture in said aperture plate when the opaque means are disposed opposite this aperture during rotation of said prism.

7. A construction in accordance with claim 5 wherein the drive means for said prism are connected to the drive means for said film strip whereby the movement of said prism and said film strip is synchronized to provide for disposition of a face of said prism opposite said aperture as each frame of said film strip is centered with respect to said aperture.

8. A construction in accordance with claim 5 including lens means disposed adjacent said prism in the path of the light beam passing through said prism, and reflecting mirrors disposed in said path beyond said lens means for directing the light beam onto said projector screen.

9. A construction in accordance with claim 8 including means for adjusting the position of said lens means between said prism and said reflecting mirrors.

References Cited by the Examiner

UNITED STATES PATENTS

| | | | |
|---|---|---|---|
| 1,204,771 | 11/1916 | Hopkins | 352—119 |
| 2,422,816 | 6/1947 | Baia | 352—119 X |
| 2,906,167 | 9/1959 | Castedello et al. | 352—119 X |
| 3,041,925 | 7/1962 | Bavaro | 88—24 X |
| 3,139,789 | 7/1964 | Schrader | 352—72 |
| 3,176,310 | 3/1965 | Finnerty | 352—72 X |

JULIA E. COINER, *Primary Examiner.*